US008436085B2

(12) United States Patent  
Borke et al.

(10) Patent No.: US 8,436,085 B2
(45) Date of Patent: May 7, 2013

(54) BARRIER PROPERTIES OF SUBSTANTIALLY LINEAR HDPE FILM WITH NUCLEATING AGENTS

(75) Inventors: Jeffrey S. Borke, Middletown, OH (US); Douglas C. McFaddin, Cincinnati, OH (US); Stephen M. Imfeld, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 616 days.

(21) Appl. No.: 11/717,944

(22) Filed: Mar. 14, 2007

(65) Prior Publication Data

US 2008/0227900 A1   Sep. 18, 2008

(51) Int. Cl.
*C08K 5/04* (2006.01)
*C08K 5/09* (2006.01)
*D06M 15/693* (2006.01)
*C09D 4/00* (2006.01)
*C09D 201/00* (2006.01)
*C09J 4/00* (2006.01)
*C09J 201/00* (2006.01)

(52) U.S. Cl.
USPC ...................... 524/394; 106/170.35

(58) Field of Classification Search .................. 524/394; 106/170.35
See application file for complete search history.

(56) References Cited

U.S. PATENT DOCUMENTS

| 5,525,695 | A | * | 6/1996 | Lai et al. | 526/352 |
| 5,922,793 | A | | 7/1999 | Amos et al. | 524/159 |
| 6,547,094 | B1 | * | 4/2003 | Jacobs | 220/839 |
| 6,562,890 | B2 | | 5/2003 | Dotson | 524/396 |
| 6,599,971 | B2 | | 7/2003 | Dotson et al. | 524/394 |
| 6,794,433 | B2 | | 9/2004 | Dotson et al. | 524/241 |
| 7,074,949 | B2 | | 7/2006 | Bos | 556/130 |
| 7,094,820 | B2 | | 8/2006 | Zhao et al. | 524/285 |
| 7,144,939 | B2 | | 12/2006 | Dotson et al. | 524/394 |
| 2004/0010107 | A1 | * | 1/2004 | Dotson | 526/351 |
| 2005/0038155 | A1 | | 2/2005 | Berghmans et al. | 524/282 |
| 2005/0048281 | A1 | * | 3/2005 | Royer et al. | 428/364 |
| 2005/0215716 | A1 | * | 9/2005 | Szul et al. | 525/191 |
| 2006/0142452 | A1 | | 6/2006 | Wolters et al. | 524/394 |
| 2007/0036960 | A1 | | 2/2007 | Lambert et al. | 428/220 |
| 2007/0066733 | A1 | | 3/2007 | Hanssen et al. | 524/394 |
| 2007/0244233 | A1 | * | 10/2007 | Hild et al. | 524/176 |

FOREIGN PATENT DOCUMENTS

| WO | WO 2005090464 A1 * | 9/2005 |
| WO | 2007/021381 | 2/2007 |
| WO | WO 2007/033297 | 3/2007 |
| WO | PCT/US2008/001470 | 10/2008 |

OTHER PUBLICATIONS

Benham et al., Ethylene Polymers, HDPE, 2001, John Wiley and Sons.*
Osman et al. Macromol. Rapid Commun. 2004, 25, 1540-1544.*
S. Shroff et al., "Long-Chain-Branching Index for Essentially Linear Polyethylenes", *Macromolecules*, 32(25), (1999), p. 854.
H. N. Beck, *Journal of Applied Polymer Science*, 11, (1967), p. 673.
J. Botkin et al., *Improving Molding Productivity and Enhancing Mechanical Properties of Polypropylene with Nucleating Agents*, (2002), Ciba Specialty Chemicals Inc.
H. Fruitwala et al., "Characterization of Blown Film Morphology", *Journal of Plastic Film & Sheeting*, 11, (1995), p. 298.
A. Hiltner et al., "Oxygen Transport as a Solid-State Structure Probe for Polymeric Materials: A Review", *Journal of Polymer Science: Part B: Polymer Physics*, 43, (2005), p. 1047.
"Milliken & Company Announces Introduction of a Patented New Additive for Use in Polyolefin Applications", Milliken & Company, (2006), http://millikenchemical.com/chemical.
"Ciba develops new high performance nucleator," *Plastics Additives and Compounding, Elsevier Science*, Oxford, GB, vol. 8, No. 2, Mar. 1, 2006, p. 15, XP005413506, ISSN: 1464-391x, the whole document.
"Milliken Chemical enters polyethylene market," *Plastics Additives and Compounding, Elsevier Science*, Oxford, GB, vol. 8, No. 4, Jul. 1, 2006, p. 12, XP005595187, ISSN: 1464-391X, the whole document.
Hans Zweifel, "Nucleating Agents for Semi-crystalline Polymers," *Plastics Additives Handbook*, 5th Edition, pp. 956, 960-961, (2001).
M.Horrocks/C.Kersher, "A Novel Nucleating Agent for Polythylene"; The International Conference on Polyolefins 2007; Feb. 25, 2007.
Liang, Wenbin et al., "Structure, Morphology and Design of HPDE Barrier Resins" Flexible Packaging Conference, 2006.
Letter of Ms. Biggs Diecks.
Slides of presentation for M.Horrocks/C.Kerscher, "A Novel Nucleating Agent for Polythylene"; The International Conference on Polyolefins 2007; Feb. 25, 2007.
Todd, William, "Variables that Affect/Control High-Density Polyethylene Film", Journal of Plastic Film and Sheeting;vol. 19, Issue 3, pp. 209-220.
Todd, William. "Variables that Affect/Control High Density Polyethylene Film Oxygen/Moisture Barrier" presented at ANTEC 2003, May 4, 2003.
Modern Plastics Magazine e-Weekly Feb. 19-23, 2007.
"Milliken chemical enters polythylene market," Plastics Additives & Compounding, vol. 84. Jul./Aug. 2006, p. 12.
Brandon Barker, "Benefits of Nucleators in Film Applications," SPE FlexCon 2006.
K-News article, Mar. 15, 2007.
Notice of Opposition of EP2118193 dated Oct. 13, 2011.

* cited by examiner

*Primary Examiner* — Liam Heincer

(57) ABSTRACT

Disclosed is a method for improving the barrier properties of polyethylene films. The method comprises mixing a substantially linear, high density polyethylene with a nucleating agent and converting the mixture into a film. The film made by the method of the invention has at least a 15% improvement on the water vapor barrier property and/or in the oxygen barrier property compared with the control film made from the same substantially linear, high density polyethylene but does not contain the nucleating agent.

16 Claims, No Drawings

BARRIER PROPERTIES OF SUBSTANTIALLY LINEAR HDPE FILM WITH NUCLEATING AGENTS

FIELD OF THE INVENTION

The invention relates to polyethylene films. More particularly, the invention relates to a method for improving the barrier properties of substantially linear, high density polyethylene films with nucleating agents.

BACKGROUND OF THE INVENTION

Polyethylene films have established a major position in the food packaging industry due to their excellent shelf life, product protection, product display, and low cost. The characteristic of the packaged food product determines the optimal barrier performance of the packaging materials. Optimal barrier for some food products requires high barrier materials, while others need low barrier materials. For instance, dry foods, such as cereals, crackers, cookies and powdered products, require the packaging materials have high barrier to water vapor or moisture, while poultry products require the packaging materials have high barrier to oxygen.

High density polyethylene (HDPE)-based films are the material of choice for many of these packaging applications. HDPE layers provide desirable physical properties such as impact resistance, tear strength and tensile properties to the multilayer films. However, HDPE films do not have sufficient barrier properties for food packaging. Thus, the multilayer films often include one or more barrier layers. Commonly used barrier resins include ethylene-vinyl acetate (EVA) copolymers, ethylene-vinyl alcohol (EVOH) copolymers, nylons and the like. Barrier resins usually cost more than HDPE. Therefore, there is a need to improve the barrier properties of HDPE films. HDPE films of improved barrier properties may replace more expensive multilayer barrier films. Alternatively, HDPE films of improved barrier properties may be used as layers in multilayer barrier films to reduce the use of more expensive barrier resin layers.

Nucleating agents are commonly used in polypropylene. It changes the crystallization temperature, spherulitic size, density, clarity, impact and tensile properties of polypropylene. Similarly, nucleating agents are also used in polyethylene, particularly in linear low density polyethylene (LLDPE) to improve optical, impact, and other physical properties. However, the use of nucleating agent in high density polyethylene (HDPE) is less common because HDPE readily crystallizes without nucleating agent. In general, nucleating agents do not significantly improve the barrier properties of HDPE films.

SUMMARY OF THE INVENTION

The invention is a method for improving the barrier properties of substantially linear, high density polyethylene (HDPE) film. The method comprises mixing a substantially linear HDPE with a nucleating agent and converting the mixture into a film. The substantially linear HDPE has a long chain branching index (LCBI) less than or equal to 0.5 and a melt flow ratio (MFR) less than or equal to 65. The film produced by the method of the invention has significantly improved barrier properties. The film has at least a 15% improvement, compared with a control film made from the same substantially linear HDPE but does not contain the nucleating agent, in the water vapor barrier property and/or in the oxygen barrier property.

We surprisingly found that using a substantially linear HDPE is critical to achieving the improved barrier properties. When an HDPE that contains a high concentration of long-chain branches, i.e., LCBI>0.5, or has a relatively broad molecular weight distribution, i.e., MFR>65, is mixed with the nucleating agent, the film produced from the mixture show insignificant improvement on the barrier properties. In some cases, the films even show impaired, rather than improved, barrier properties.

DETAILED DESCRIPTION OF THE INVENTION

The invention is a method for improving the barrier properties of a substantially linear, high density polyethylene (HDPE) film. The method comprises incorporating a nucleating agent into a substantially linear HDPE and converting the substantially linear HDPE into a film.

By "substantially linear," we mean that the HDPE is essentially free of long chain branching and relatively narrow in molecular weight distribution. Long chain branching can be measured by NMR, 3D-GPC, and rheology. While NMR directly measures the number of branches, it cannot differentiate between branches which are six carbons or longer. 3D-GPC with intrinsic viscosity and light scattering detection can account for all branches that substantially increase mass at a given radius of gyration. Rheology is particularly suitable for detecting low level of long chain branches.

The concentration of long chain branches can be measured by the long chain branch index (LCBI). LCBI is a rheological index used to characterize low levels of long-chain branching. LCBI is defined as:

$$LCBI = \frac{\eta_0^{0.179}}{4.8 \cdot [\eta]} - 1$$

where $\eta_0$ is the limiting, zero-shear viscosity (Poise) at 190° C. and $[\eta]$ is the intrinsic viscosity in trichlorobenzene at 135° C. (dL/g). LCBI is based on observations that low levels of long-chain branching, in an otherwise linear polymer, result in a large increase in melt viscosity, $\eta_0$, with no change in intrinsic viscosity, $[\eta]$. See R. N. Shroff and H. Mavridis, "Long-Chain-Branching Index for Essentially Linear Polyethylenes," Macromolecules, Vol. 32 (25), pp. 8454-8464 (1999). Higher LCBI means a greater number of long-chain branches per polymer chain.

The substantially linear HDPE suitable for the use in the method of the invention has an LCBI less than or equal to 0.5. Preferably, the substantially linear HDPE has an LCBI less than or equal to 0.3. More preferably, the substantially linear HDPE has an LCBI less than or equal to 0.2.

Suitable substantially linear HDPE has a relatively narrow molecular weight distribution. Molecular weight and molecular weight distribution can be measured by gel permeation chromatography (GPC). Alternatively, the molecular weight and molecular weight distribution can be indicated by melt indices. Melt index ($MI_2$) is usually used to measure the molecular weight and melt flow ratio (MFR) to measure the molecular weight distribution. A larger $MI_2$ indicates a lower molecular weight. A larger MFR indicates a broader molecular weight distribution. MFR is the ratio of the high-load melt index (HLMI) to $MI_2$. The $MI_2$ and HLMI can be measured according to ASTM D-1238. The $MI_2$ is measured at 190° C. under 2.16 kg pressure. The HLMI is measured at 190° C. under 21.6 kg pressure.

Suitable substantially linear HDPE has an MFR less than or equal to 65. Preferably, the substantially linear HDPE has an MFR less than or equal to 40. More preferably, the substantially linear HDPE has an MFR less than or equal to 20.

We surprisingly found that not only the LCBI but also the MFR of the substantially linear HDPE are critical to achieving the improved barrier properties of the film. We found that when the HDPE contains a high concentration of long chain branching (high LCBI) or has a broad molecular weight distribution (high MFR), the film shows insignificant improvement on the barrier properties. In some cases, the film even shows impaired, rather than improved, barrier properties.

Preferably, the substantially linear HDPE has a medium molecular weight. Preferably, the substantially linear HDPE has an $MI_2$ within the range of 0.5 to 50 dg/min. More preferably, the substantially linear HDPE has an $MI_2$ within the range of 1 to 10 dg/min. Most preferably, the substantially HDPE has an $MI_2$ within the range of 1 to 5 dg/min.

Preferably, the substantially linear HDPE has a density greater than or equal to 0.941 $g/cm^3$. More preferably, the substantially linear HDPE has a density greater than or equal to 0.950 $g/cm^3$. Most preferably, the substantially linear HDPE has a density greater than or equal to 0.955 $g/cm^3$.

Suitable nucleating agents include glycerol alkoxide salts, hexahydrophthalic acid salts, the like, and mixtures thereof. The salts include ammonium and metal salts. Preferably, the glycerol alkoxide salt is selected from the group consisting of zinc, magnesium, and calcium glycerolates and mixtures thereof. More preferably, the glycerol alkoxide salt is a zinc glycerolate. Preferably, the hexahydrophthalic acid salt is selected from the group consisting of zinc, magnesium, and calcium hexahydrophthalates and mixtures thereof. More preferably, the hexahydrophthalic acid salt is calcium hexahydrophthalate. Many glycerol alkoxide salts and hexahydrophthalic acid salts are commercially available. For instance, zinc glycerolate is available from Ciba Specialty Chemicals as Irgastab® 287. Calcium hexahydrophthalate is available from Milliken Company as Hyperform® HPN-20E.

The amount of nucleating agent used varies depending on many factors such as the nucleating agent type, the properties of the substantially linear HDPE, the targeted improvement of the barrier properties of the polyethylene film. In general, the nucleating agent is used in an amount within the range of about 0.01 wt % to 1 wt % of the weight of the substantially linear HDPE. Preferably, the amount of the nucleating agent is within the range of about 0.05 to about 0.5 wt of the weight of the substantially linear HDPE.

The nucleating agent and the substantially linear HDPE can be blended thermally, in solution, or by any other suitable techniques. Preferably, the nucleating agent and the substantially linear HDPE are thermally blended in a mixer or extruder.

Optionally, the blend contains antioxidants, UV-absorbents, flow agents, or other additives. The additives are well known in the art. Additives are added in an amount preferably less than 10 wt % of the total blend. The blend can be converted to polyethylene film by any film processes such as blown film process and cast film process.

The polyethylene film made by the method of the invention has significantly improved water vapor and oxygen barrier properties. The film made by the method of the invention has at least a 15% improvement, compared with a control film which is made from the same substantially linear HDPE but does not contain the nucleating agent, in the water vapor barrier property and/or in the oxygen barrier property. Preferably, the film made by the method of the invention has at least a 25% improvement in the water vapor barrier property and/or in the oxygen barrier property. More preferably, the film made by the method of the invention has at least a 45% improvement in the water vapor barrier property and/or in the oxygen barrier property.

The film made by the method of the invention can be used as a monolayer film. It can also be used as a layer of multilayer film. The film made by the method of the invention is useful in many applications. It is particularly useful as packaging film where the improved barrier properties are desirable.

The following examples merely illustrate the invention. Those skilled in the art will recognize many variations that are within the spirit of the invention and scope of the claims.

Example 1

A substantially linear, high density polyethylene (14528 grams), which has a density of 0.960 $g/cm^3$, long chain branching index (LCBI) of 0.105, melt index $MI_2$ of 2.0 dg/min, melt flow ratio MFR of 44, is blended with calcium hexahydrophthalate (14.5 grams, Hyperform® HPN-20E, product of Milliken and Company). The blending is performed in a Kobelco Stewart Bowling Mixer at a drop temperature of 151° C. for 4 minutes. The mixture is converted to a film with a thickness of 1.25 mils on a Davis Standard blown film line with a 24:1 extruder running at a screw speed of 50 rpm. The extruder is equipped with a 50 mm barrier Maddock screw. The film is produced on a 101.6 mm mono layer blown film die with a 1.5 mm die gap and in the pocket using a duel lip air ring with a blow up ratio (BUR) of 2.2:1. The resulted Example film has a water vapor transmission rate (WVTR) of 0.15 g.mil/100 si/day (ASTM F 1249 @ 100% humidity) and an oxygen transmission rate (OTR) of 67 cc.mil/100 si/day (ASTM D 3985 @ dry conditions).

A control film is made from the same substantially linear HDPE without the addition of the nucleating agent. The control film is made under the same conditions as the Example film. The control film has a WVTR of 0.28 g.mil/100 si/day and OTR of 134 cc.mil/100 si/day.

The improvements on the water vapor barrier and oxygen barrier properties are calculated based on the following formula, respectively:

Improvement on water vapor barrier property=(*WVTR* of the control film–*WVTR* of the Example film)/ *WVTR* of the control film×100%

Improvement on oxygen barrier property=(*OTR* of the control film–*OTR* of the Example film)/*OTR* of the control film×100%.

A positive improvement value indicates that the addition of the nucleating agent increases the barrier property of the polyethylene film. A negative improvement value indicates that the nucleating agent decreases the barrier property of the polyethylene film. For Example 1, the improvements on water vapor barrier property and oxygen barrier property are 46.4% and 50.0%, respectively. The improvement values are listed in Table 1.

Example 2

Example 1 is repeated but a different substantially linear HDPE is used. The substantially linear HDPE used in this Example has a density of 0.958 $g/cm^3$, LCBI of 0.219, $MI_2$ of 0.85 dg/min, and MFR of 65. The Example film has a WVTR of 0.19 g.mil/100 si/day and OTR of 83 cc.mil/100 si/day. The control film has a WVTR of 0.27 g.mil/100 si/day and OTR of 126 cc.mil/100 si/day. The improvements on water vapor barrier property and oxygen barrier property are 29.6% and 34.1%, respectively. The improvement values are listed in Table 1.

Example 3

Example 1 is repeated but a different substantially linear HDPE is used. The substantially linear HDPE used in this Example has a density of 0.954 $g/cm^3$, LCBI of 0.171, $MI_2$ of 0.85 dg/min, and MFR of 65. The Example film has a WVTR of 0.20 g.mil/100 si/day and OTR of 98 cc.mil/100 si/day. The control film has a WVTR of 0.29 g.mil/100 si/day and OTR of 133 cc.mil/100 si/day. The improvements on water vapor barrier property and oxygen barrier property are 31.0% and 26.3%, respectively. The improvement values are listed in Table 1.

Example 4

Example 1 is repeated but a different substantially linear HDPE is used. The substantially linear HDPE used in this Example has a density of 0.965 g/cm$^3$, LCBI of 0.105, MI$_2$ of 8.2 dg/min, and MFR of 31. The Example film has a WVTR of 0.12 g.mil/100 si/day and OTR of 59 cc.mil/100 si/day. The control film has a WVTR of 0.24 g.mil/100 si/day and OTR of 126 cc.mil/100 si/day. The improvements on water vapor barrier property and oxygen barrier property are 50.0% and 53.2%, respectively. The improvement values are listed in Table 1.

Example 5

Example 1 is repeated but a different substantially linear HDPE is used. The substantially linear HDPE used in this Example has a density of 0.955 g/cm$^3$, LCBI of 0.3, MI$_2$ of 1.0 dg/min, and MFR of 19.9. The Example film has a WVTR of 0.20 g.mil/100 si/day and OTR of 97 cc.mil/100 si/day. The control film has a WVTR of 0.38 g.mil/100 si/day and OTR of 180 cc.mil/100 si/day. The improvements on water vapor barrier property and oxygen barrier property are 47.4% and 46.1%, respectively. The improvement values are listed in Table 1.

Example 6

Example 1 is repeated but a different substantially linear HDPE is used. The substantially linear HDPE used in this Example has a density of 0.956 g/cm$^3$, LCBI of 0.324, MI$_2$ of 1.0 dg/min, and MFR of 20.8. The Example film has a WVTR of 0.19 g.mil/100 si/day and OTR of 88 cc.mil/100 si/day. The control film has a WVTR of 0.35 g.mil/100 si/day and OTR of 177 cc.mil/100 si/day. The improvements on water vapor barrier property and oxygen barrier property are 45.7% and 50.3%, respectively. The improvement values are listed in Table 1.

Example 7

Example 1 is repeated but a different nucleating agent is used. The nucleating agent used in this Example is zinc monoglycerolate (Irgastab® 287, product of Ciba Specialty Chemicals). The Example film has a WVTR of 0.13 g.mil/100 si/day and an OTR of 61 cc.mil/100 si/day. The control film has a WVTR of 0.28 g.mil/100 si/day and OTR of 134 cc.mil/100 si/day. The improvements on water vapor barrier property and oxygen barrier property are 53.6% and 54.5%, respectively. The improvement values are listed in Table 1.

Comparative Example 8

Example 1 is repeated but a different nucleating agent is used. The nucleating agent used in this Comparative Example is methylene-bis-(4,6-di-tert-butylphenyl)phosphate sodium salt (Irgastab® NA 11, product of Ciba Specialty Chemicals). The Comparative Example film has a WVTR of 0.31 g.mil/100 si/day and OTR of 165 cc.mil/100 si/day. The control film has a WVTR of 0.28 g.mil/100 si/day and OTR of 134 cc.mil/100 si/day. The improvements on water vapor barrier property and oxygen barrier property are −10.7% and −23.1%, respectively. The improvement values are listed in Table 1.

Comparative Example 9

Example 4 is repeated but a different nucleating agent is used. The nucleating agent used in this Comparative Example is Hyperform® HPN-68L, product of Milliken and Company. HPN-68L is a mixture of 80% bicyclic[2,2,1]heptane dicarboxylic acid sodium salt with zinc stearate and calcium stearate. The Example film has a WVTR of 0.25 g.mil/100 si/day and OTR of 116 cc.mil/100 si/day. The control film has a WVTR of 0.27 g.mil/100 si/day and OTR of 126 cc.mil/100 si/day. The improvements on water vapor barrier property and oxygen barrier property are 7.4% and 7.9%, respectively. The improvement values are listed in Table 1.

Comparative Example 10

Example 1 is repeated but a non-substantially linear HDPE is used. For the purpose of this application, "non-substantially linear HDPE" means that the HDPE either has an LCBI greater than 0.5 or has an MFR greater than 65. The non-substantially linear HDPE used in this Comparative Example has a density of 0.960 g/cm$^3$, LCBI of 0.660, MI$_2$ of 0.8 dg/min, and MFR of 68. The Comparative Example film has a WVTR of 0.51 g.mil/100 si/day and OTR of 239 cc.mil/100 si/day. The control film has a WVTR of 0.50 g.mil/100 si/day and OTR of 243 cc.mil/100 si/day. The improvements on water vapor barrier property and oxygen barrier property are −0.02% and 1.7%, respectively. The improvement values are listed in Table 1.

Comparative Example 11

Example 1 is repeated but a non-substantially linear HDPE is used. The non-substantially linear HDPE used in this Comparative Example has a density of 0.959 g/cm$^3$, LCBI of 0.325, MI$_2$ of 0.06 dg/min, and MFR of 155. The Comparative Example film has a WVTR of 0.61 g.mil/100 si/and OTR of 314 cc.mil/100 si/day. The control film has a WVTR of 0.64 g.mil/100 si/day and OTR of 356 cc.mil/100 si/day. The improvements on water vapor barrier property and oxygen barrier property are 4.7% and 11.8%, respectively. The improvement values are listed in Table 1.

Comparative Example 12

Example 1 is repeated but a non-substantially linear HDPE is used. The non-substantially linear HDPE used in this Comparative Example has a density of 0.949 g/cm$^3$, LCBI of 0.563, MI$_2$ of 0.33 dg/min, and MFR of 81. The Comparative Example film has a WVTR of 0.50 g.mil/100 si/day and OTR of 251 cc.mil/100 si/day. The control film has a WVTR of 0.56 g.mil/100 si/day and OTR of 270 cc.mil/100 si/day. The improvements on water vapor barrier property and oxygen barrier property are 10.7% and 7.0%, respectively. The improvement values are listed in Table 1.

Comparative Example 13

Example 1 is repeated but a non-substantially linear HDPE is used. The non-substantially linear HDPE used in this Comparative Example has a density of 0.958 g/cm$^3$, LCBI of 0.570, MI$_2$ of 1.3 dg/min, and MFR of 25.7. The Comparative Example film has a WVTR of 0.32 g.mil/100 si/day and OTR of 157 cc.mil/100 si/day. The control film has a WVTR of 0.30 g.mil/100 si/day and OTR of 146 cc.mil/100 si/day. The improvements on water vapor barrier property and oxygen barrier property are −6.7% and −7.5%, respectively. The improvement values are listed in Table 1.

TABLE 1

Improvement on Barrier Properties of Substantially Linear HDPE Films

| Ex. No. | Substantially Linear HDPE LCBI | Substantially Linear HDPE MFR | Non-Substantially Linear HDPE LCBI | Non-Substantially Linear HDPE MFR | Nucleating Agent | Improvement of Water Vapor Barrier, % | Improvement of Oxygen Barrier, % |
|---|---|---|---|---|---|---|---|
| 1 | 0.105 | 44 | — | — | Hexahydrophthalic acid calcium salt | 46.4 | 50.0 |
| 2 | 0.219 | 65 | — | — | Hexahydrophthalic acid calcium salt | 29.6 | 34.1 |
| 3 | 0.171 | 65 | — | — | Hexahydrophthalic acid calcium salt | 31.0 | 26.3 |
| 4 | 0.105 | 31 | — | — | Hexahydrophthalic acid calcium salt | 50.0 | 53.2 |
| 5 | 0.300 | 19.9 | — | — | Hexahydrophthalic acid calcium salt | 47.4 | 46.1 |
| 6 | 0.304 | 20.8 | — | — | Hexahydrophthalic acid calcium salt | 45.7 | 50.3 |
| 7 | 0.105 | 44 | — | — | Zinc monoglycerolate | 53.6 | 54.5 |
| C8 | 0.105 | 44 | | | Methylene-bis-(4,6-di-tert-butylphenyl)phosphate sodium salt | −10.7 | −23.1 |
| C9 | 0.219 | 55 | | | Bicyclic[2,2,1]heptane discarboxylic acid sodium salt mixed with zinc stearate and calcium stearate | 7.4 | 7.9 |
| C10 | | — | 0.660 | 68 | Hexahydrophthalic acid calcium salt | 0 | 1.7 |
| C11 | — | — | 0.325 | 155 | Hexahydrophthalic acid calcium salt | 4.7 | 11.8 |
| C12 | — | — | 0.563 | 81 | Hexahydrophthalic acid calcium salt | 10.7 | 7.0 |
| C13 | — | — | 0.570 | 25.7 | Hexahydrophthalic acid calcium salt | −6.7 | 7.5 |

We claim:

1. A method for improving the barrier properties of a polyethylene film, said method comprising the step of:
   converting into a film a mixture comprising
   a substantially linear, high density polyethylene (HDPE) having a long chain branching index (LCBI) less than or equal to 0.5 and a melt flow ratio (MFR) less than or equal to 65, and
   a nucleating agent selected from the group consisting of glycerol alkoxide salts, hexahydrophthalic acid salts, and mixtures thereof,
   wherein the nucleating agent is present in an amount within the range of about 0.01 wt. % to 1 wt. % of the weight of the substantially linear, high density polyethylene,
   wherein the film has at least a 15% improvement, compared with a control film which is made from the same substantially linear HDPE but does not contain the nucleating agent, in the water vapor barrier property or in the oxygen barrier property.

2. The method of claim 1, wherein the nucleating agent is a metal glycerolate selected from the group consisting of zinc glycerolates, magnesium glycerolates, calcium glycerolates, and mixtures thereof.

3. The method of claim 1, wherein the nucleating agent is a zinc glycerolate.

4. The method of claim 1, wherein the nucleating agent is a hexahydrophthalic acid metal salt selected from zinc hexahydrophthalate, magnesium hexahydrophthalate, calcium hexahydrophthalate, and mixtures thereof.

5. The method of claim 1, wherein the nucleating agent is calcium hexahydrophthalate.

6. The method of claim 1, wherein the substantially linear HDPE has an LCBI less than or equal to 0.3.

7. The method of claim 1, wherein the substantially linear HDPE has an LCBI less than or equal to 0.2.

8. The method of claim 1, wherein the substantially linear HDPE has an MFR less than or equal to 40.

9. The method of claim 1, wherein the substantially linear HDPE has an MFR less than or equal to 20.

10. The method of claim 1, wherein the substantially linear HDPE has a melt index ($MI_2$) within the range of 0.5 to 50 dg/min.

11. The method of claim 1, wherein the substantially linear HDPE has a melt index ($MI_2$) within the range of 1 to 10 dg/min.

12. The method of claim 1, wherein the film has at least a 25% improvement in the water vapor barrier property.

13. The method of claim 1, wherein the film has at least a 45% improvement in the water vapor barrier property.

14. The method of claim 1, wherein the film has at least a 25% improvement in the oxygen barrier property.

15. The method of claim 1, wherein the film has at least a 45% improvement in the oxygen barrier property.

16. The method of claim 1, wherein the film has at least a 45% improvement in the water barrier property and at least a 45% improvement in the oxygen barrier property.

* * * * *